Figure 1:
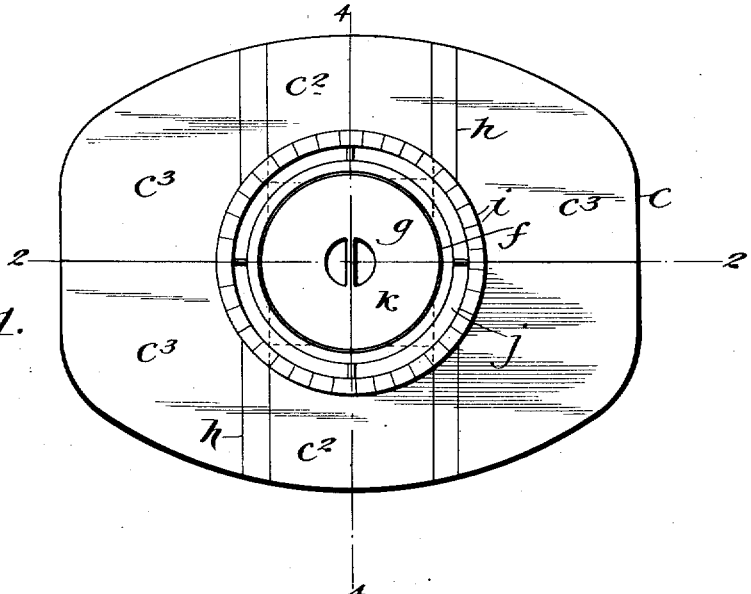

No. 12,205. REISSUED MAR. 22, 1904.

H. C. BAKER, Jr.

CONSTRUCTION OF MANHOLES FOR CONDUITS.

APPLICATION FILED FEB. 3, 1904.

3 SHEETS—SHEET 1.

WITNESSES

A. R. Schuman

F. A. Stewart

INVENTOR

Hugh C. Baker, Jr.

BY

Edgar Tate & Co

ATTORNEYS

No. 12,205. REISSUED MAR. 22, 1904.

H. C. BAKER, Jr.

CONSTRUCTION OF MANHOLES FOR CONDUITS.

APPLICATION FILED FEB. 3, 1904.

3 SHEETS—SHEET 2.

WITNESSES

A. R. Spencer

F. A. Stewart

INVENTOR

BY Hugh C. Baker, Jr.

Edgar Tate & Co

ATTORNEYS

No. 12,205. REISSUED MAR. 22, 1904.

H. C. BAKER, JR.

CONSTRUCTION OF MANHOLES FOR CONDUITS.

APPLICATION FILED FEB. 3, 1904.

3 SHEETS—SHEET 3.

WITNESSES

A. Rodeman

F. A. Stewart

INVENTOR

Hugh C. Baker, Jr.

BY Edgar Tate & Co

ATTORNEYS

No. 12,205. Reissued March 22, 1904.

UNITED STATES PATENT OFFICE.

HUGH C. BAKER, JR., OF NEW YORK, N. Y.

CONSTRUCTION OF MANHOLES FOR CONDUITS.

SPECIFICATION forming part of Reissued Letters Patent No. 12,205, dated March 22, 1904.

Original No. 734,153, dated July 21, 1903. Application for reissue filed February 3, 1904. Serial No. 191,910.

*To all whom it may concern:*

Be it known that I, HUGH C. BAKER, Jr., a subject of the King of Great Britain, residing at New York, in the county of New York and State of New York, have invented certain new and useful Improvements in the Construction of Manholes for Electrical and other Conduits, of which the following is a specification such as will enable those skilled in the art to which it appertains to make and use the same.

The object of this invention is to provide a manhole for electrical and other conduits of improved construction whereby the said construction is simplified and the cost thereof materially reduced; and the invention consists of the form of the manhole and of the details of the construction thereof and of the material of which the manhole is composed and the shape or form thereof.

The invention is fully disclosed in the following specification, of which the accompanying drawings form a part, in which the separate parts of my improvement are designated by suitable reference characters in each of the views, and in which—

Figure 2:
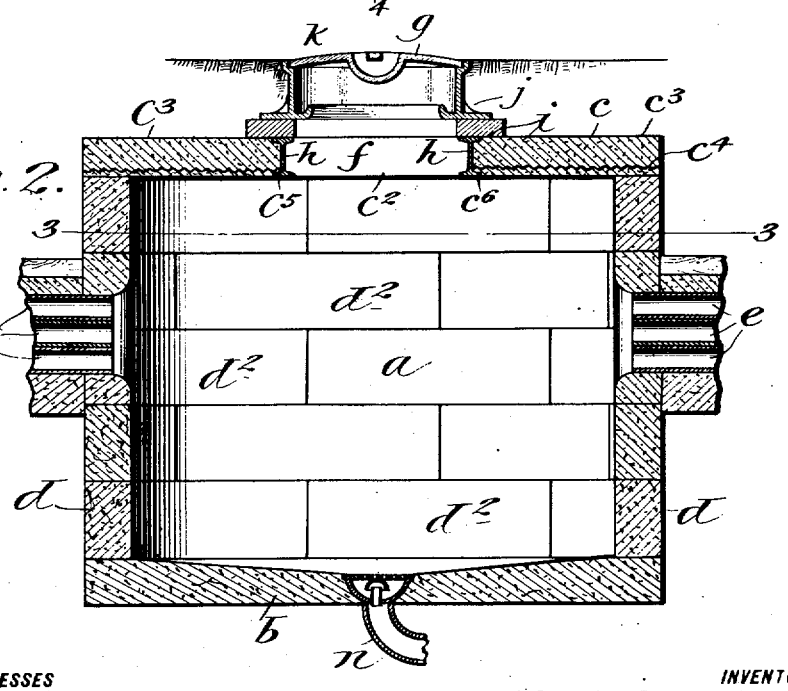
Figure 3:
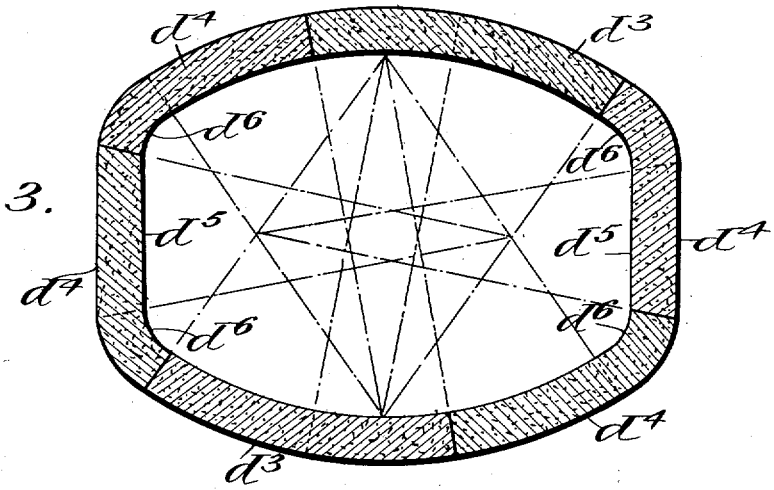
Figure 1:
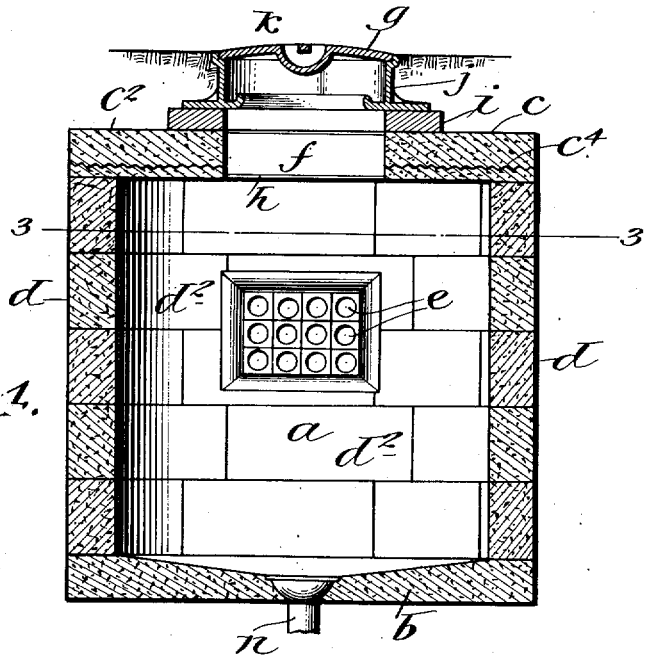
Figure 5:
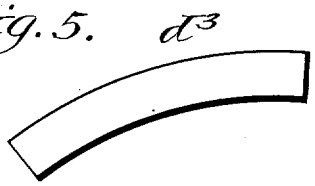
Figure 7:
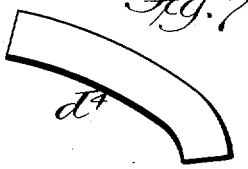
Figure 8:
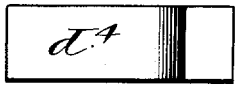
Figure 9:
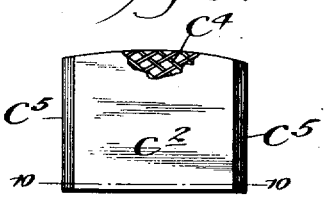
Figure 11:
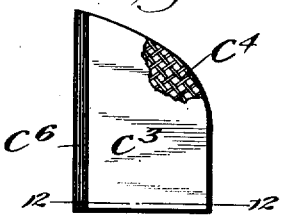
Figure 10:
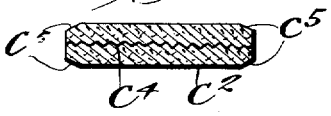
Figure 12:
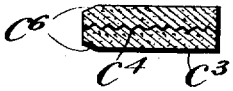

Figure 1 is a plan view of a manhole for an electrical conduit made according to my invention; Fig. 2, a section thereon on the line 2 2 of Fig. 1; Fig. 3, a section on the line 3 3 of Fig. 2 or on the line 3 3 of Fig. 4; Fig. 4, a section on the line 4 4 of Fig. 1; Figs. 5 and and 6, a plan and inside view, respectively, of one form of a brick or block employed in the construction of the manhole; Figs. 7 and 8, views similar to Figs. 5 and 6 of another form of a brick or block employed in the construction of the manhole; Figs. 9 and 10, a plan and transverse section, respectively, of bricks or blocks from which the cover of the manhole is formed, part of the construction in Fig. 9 being broken away; and Figs. 11 and 12 are views similar to Figs. 9 and 10, showing another form of a brick or block employed in the construction of the cover of the manhole.

In the practice of my invention I provide a manhole $a$, composed of a concrete or other suitable bottom $b$, a cover $c$, an inclosing wall or walls $d$, through which electrical conduits $e$ are passed in the usual or any desired manner and in the top of which is the usual manhole opening $f$, having a cover $g$.

Figure 6:
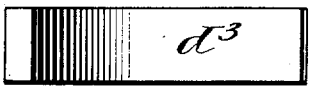

The inclosing wall $d$ of the manhole is composed of separate horizontal layers of bricks or blocks $d^2$, and these separate layers of bricks or blocks are composed of two different forms of bricks or blocks $d^3$ and $d^4$, which are shown in detail in Figs. 5 and 6 and in Figs. 7 and 8, respectively.

It will be observed that the form of the manhole in horizontal section is substantially elliptical, the ends thereof being truncated or cut off in such a manner as to form a slight end curve in horizontal section, the corners of which are abruptly curved, as indicated at $d^5$ and $d^6$ in Fig. 3.

The separate bricks or blocks $d^3$ and $d^4$ from which the inclosing wall $d$ or the body wall of the manhole is made are preferably composed of concrete, but may be composed of any desired material capable of being molded into suitable shape, and these separate bricks or blocks are of the form shown in Figs. 5 to 8, inclusive, the bricks or blocks $d^3$ being segmental both at their inner and outer sides, while the bricks or blocks $d^4$ are abruptly curved inwardly at one end, as shown at $d^7$ in Figs. 7 and 8, and in Fig. 3 I have shown diagrammatically the method of producing the forms of the different bricks or blocks which make up the separate layers $d^2$, which constitute the inclosing or body wall $d$ of the manhole.

It will be understood, of course, that the dimensions of the bricks or blocks $d^3$ and $d^4$ may be regulated so as to produce a manhole of any desired size in horizontal section, and the depth of the manhole will depend on the depth of the separate bricks or blocks $d^3$ and $d^4$ and on the number of layers of such bricks or blocks employed, and in practice these bricks or blocks are placed together in the manner of ordinary bricks or blocks, so that the joints in one layer are broken or overlapped by the layer thereover, and in order to use the end bricks or blocks $d^4$ in the successive layers they must simply be reversed in each successive layer.

The cover $c$ of the manhole is composed of two different styles of bricks or blocks $c^2$ and $c^3$, (shown, respectively, in Figs. 9 and 10 and Figs. 11 and 12,) and these bricks or blocks are composed of concrete or other suitable material having a reinforcement $c^4$ of expanded metal. The cover also involves, in addition to the bricks or blocks $c^2$ and $c^3$, transverse I-beams or rails $h$, as shown in Figs. 1 and 2, and in practice these beams are placed in position transversely of the top of the manhole, and the bricks or blocks $c^2$ are slid into position at the opposite sides of the manhole-opening $f$, and two of these bricks or blocks are employed, while four of the bricks or blocks $c^3$ are employed, as shown in Fig. 1, and the bricks or blocks $c^2$ are beveled at their opposite sides, as shown at $c^5$, so as to fit between the top and bottom flanges of the rails $h$, while the bricks or blocks $c^3$ are beveled at one side, as shown at $c^6$, for a similar purpose.

When the parts $h$, $c^2$, and $c^3$ have been placed together, as above described, a central rectangular opening $f$ is formed in the top $c$ of the manhole, said opening being shown in dotted lines in Fig. 1, and over and around this is placed an annular row of bricks $i$, over which is placed an annular metal casing $j$, having a removable metal cap $k$, which fits thereinto in the usual manner, and the top of the part $j$ is in practice flush with the earth-line, which is indicated at $m$ in Fig. 2. As thus constructed it will be seen that the entire inclosing or body wall $d$ of the manhole is made of bricks or blocks of two different forms, while the cover $c$ thereof consists also of bricks or blocks of two different forms, together with the transverse bars $h$, in connection with which said bricks or blocks are employed, and the interior of the manhole is of such shape in horizontal section as to facilitate the passage of electric wires thereinto and therethrough and the connection of such wires therein.

It will be seen on reference to Figs. 9 and 10 that the bricks or blocks $c^2$, as shown, have two parallel sides, to which the inner end thereof is at right angles, while the outer end thereof is segmental in form; but it will be apparent that the inner end of these bricks or blocks may be concave and segmental in form, in which case the opening $f$ would be circular in form, or substantially so, instead of rectangular, as shown. It will also be seen that the blocks $c^3$ have two sides at right angles to each other, while the other side is formed on a curve similar to that of the curve of the corner portions of the manhole in horizontal section, and by reason of this fact the bricks or blocks $c^2$ may be so placed as to form a cover for the opposite end portions of the manhole.

The manhole $a$ is also provided with the usual bottom drain $n$, and while my invention is particularly adapted for use in the construction of manholes for electrical conduits the principle thereof may also be employed in the construction of manholes and catch-basins, sewers, drains, water-mains, and other pipes or conduits of various kinds or classes.

Having fully described my invention, what I claim as new, and desire to secure by Letters Patent, is—

1. A cover for a manhole, comprising parallel bars and bricks or blocks of two different shapes, substantially as shown and described.

2. A manhole for electrical and other conduits the inclosing or body wall of which is composed of separate layers of bricks or blocks of two different styles, said bricks or blocks being curved in such a manner that they form a manhole substantially elliptical in horizontal section, said manhole being also provided with a cover comprising parallel bars and bricks or blocks of two different shapes, substantially as shown and described.

3. A manhole for electrical and other conduits the inclosing or body wall of which is composed of separate layers of bricks or blocks of two different styles, said bricks or blocks being curved in such a manner that they form a manhole substantially elliptical in horizontal section, said manhole being also provided with a cover comprising parallel bars and bricks or blocks of two different shapes, and in which is a central opening provided with a removable cover, substantially as shown and described.

4. A manhole for electrical conduits the inclosing or body wall of which is substantially elliptical in horizontal section and composed of separate layers of bricks or blocks of two different shapes, the cover of the manhole being composed of transverse bars and bricks or blocks of two different shapes and provided with a central opening, substantially as shown and described.

5. A cover for manholes, composed of parallel bars and bricks or blocks of different shapes, two of said bricks or blocks being of the same shape and being placed between said bars, and four of said bricks or blocks being of the same shape and forming the end or side portions of the cover, substantially as shown and described.

6. A manhole for electrical and other conduits, the inclosing or body wall of which is composed of separate horizontal layers of bricks or blocks of different styles and placed end to end, the transverse thickness of the wall being the same as the transverse thickness of the bricks or blocks, said bricks or blocks being also curved so as to give the manhole the desired shape in horizontal section, and said bricks or blocks being adapted to be reversed in the separate horizontal layers so as to break joints, substantially as shown and described.

7. A manhole for electrical and other conduits, the inclosing or body wall of which is composed of separate layers of bricks or blocks of two different styles, said manhole being elliptical in horizontal section and the end corner bricks or blocks of each layer being abruptly curved at one end, and said bricks or blocks being adapted to be reversed in the separate horizontal layers so as to break joints, substantially as shown and described.

In testimony that I claim the foregoing as my invention I have signed my name, in the presence of the subscribing witnesses, this 2d day of February, 1904.

HUGH C. BAKER, Jr.

Witnesses:

F. A. Stewart,

C. E. Mulreany.